Sept. 23, 1958  F. C. DU GRENIER ET AL  2,853,174
VENDING MACHINE
Filed March 8, 1955  9 Sheets-Sheet 1

FIG. 1

INVENTOR.
FRANCIS C. DUGRENIER
FRANK B. PERRI
BY

Sept. 23, 1958  F. C. DU GRENIER ET AL  2,853,174
VENDING MACHINE
Filed March 8, 1955  9 Sheets-Sheet 2

FIG. 2

INVENTOR.
FRANCIS C. DU GRENIER
FRANK B. PERRI
BY

Sept. 23, 1958

F. C. DU GRENIER ET AL

2,853,174

VENDING MACHINE

Filed March 8, 1955

INVENTOR.
FRANCIS C. DU GRENIER
FRANK B. PERRI
BY

Heard, Smith, Porter & Chittick
Attorneys

Sept. 23, 1958    F. C. DU GRENIER ET AL    2,853,174
VENDING MACHINE
Filed March 8, 1955    9 Sheets-Sheet 5

INVENTOR.
FRANCIS C. DU GRENIER
FRANK B. PERRI
BY
Heard, Smith, Porter & Chittick
Attorneys Sept. 23, 1958 F. C. DU GRENIER ET AL 2,853,174
VENDING MACHINE Filed March 8, 1955 9 Sheets-Sheet 7

INVENTOR.
FRANCIS C. DU GRENIER
FRANK B. PERRI
BY

Sept. 23, 1958  F. C. DU GRENIER ET AL  2,853,174
VENDING MACHINE
Filed March 8, 1955  9 Sheets-Sheet 8

INVENTOR.
FRANCIS C. DU GRENIER
FRANK B. PERRI

United States Patent Office 2,853,174
Patented Sept. 23, 1958

2,853,174

VENDING MACHINE

Francis C. Du Grenier, Haverhill, and Frank B. Perri, Groveland, Mass.; said Perri assignor to Blanche E. Bouchard, Haverhill, Mass.

Application March 8, 1955, Serial No. 492,827

9 Claims. (Cl. 194—54)

This invention relates to vending machines primarily designed to dispense cigarettes in package form, but which may be utilized to vend other articles at different prices.

More specifically this invention relates to improvements in vending machines whereby it is possible to vend articles at two prices with a variable price differential, and constitutes in particular an improvement in vending machines of the type described in our copending application Serial No. 243,234 filed August 23, 1951 for Coin Controlled Mechanism for Vending Machines now Patent No. 2,726,749.

For illustrative purposes the present mechanism is shown set up for vending articles, such as cigarettes, in a price range of 21¢ to 25¢ with a variable price differential therebetween of from 1¢ to 4¢. But by simple adjustments the price differential can be increased to 5¢ or the mechanism can be made to vend articles at other prices in a price range of from 5¢ to 30¢ with a price differential therebetween of from 1¢ to 25¢. In addition the machine chosen as the best setting for describing our invention is set to operate when a quarter or any combination of nickels and dimes totaling 25¢ is inserted therein.

Accordingly it is a primary object of this invention to provide a coin controlled machine for vending articles at two prices with a variable price differential.

A more specific object of this invention is to provide a vending machine having two independent devices, hereinafter called "change makers," for returning the correct change to the operator when the article selected for purchase is priced lower than the amount of money represented by the coins required to be deposited in the machine to render it operative.

Another object of this invention is to provide in a vending machine two separate change makers mounted on opposite side panels of the machine, said change makers being individually associated with different selector mechanisms which when manually operated by the operator of the machine causes said change makers to be actuated.

A further object of this invention is to provide a change maker having a battery of coin tubes and means for simultaneously removing a predetermined number of coins from each of said tubes for delivery to the operator of the machine.

Another specific object of this invention is to provide a vending machine having two change makers, means for causing one of said change makers to be operated, and means for simultaneously causing the other of said change makers to be rendered inoperative.

Other objects and many of the attendant advantages of the present invention will be readily appreciated as the same becomes better understood by reference to the following detailed description when considered in connection with the accompanying drawings, wherein:

Before explaining in detail the present invention it is to be understood that the phraseology or terminology employed herein is for the purpose of description and not of limitation, there being no intention to limit the invention described and claimed herein beyond the requirements of the prior art.

For purposes of illustration our novel change making mechanism is shown as adapted and used for a standard vertical columns-in-line type of vending machine corresponding in structure to the one described in our copending application Serial No. 243,234 filed August 23, 1951 for Coin Controlled Mechanism for Vending Machines. Accordingly the various sections of this type of vending machine are described hereinafter to better point out the novel features of our change making mechanism and the manner in which it cooperates with the conventional parts of the machine.

DISPENSING SECTION

Referring now to Figs. 1, 2, 3, and 4, there is shown a vending machine comprising side panels 10 and 12 and transversely extending panels 14 and 16. The lower portion of panel 14 is curved (Fig. 1) to act as a delivery chute.

Secured to panel 16 is a vertical wall 20 provided with channel members 22 defining a plurality of vertical compartments 24 in which packages 26 to be vended are stored. Wall 20 has an opening 28 extending thereacross, the lower edge of the opening being preferably slightly below the level of horizontal portion 30 of panel 16 which serves as a delivery platform. Slidably positioned on delivery platform 30 are a plurality of ejectors 32 each in line with one of the compartments 24. Each ejector is mounted on the inner end of a horizontal rod 34 which carries on its inner end a hook 36 extending downwardly therefrom through a slot in platform 30, and on its outer end an operating handle 38. Each rod 34 has a cut-away portion 40. A U-shaped operating shaft 44 is journaled at each end in side panels 10 and 12. The horizontal portion 46 of the shaft 44 is directly in front of hooks 36 so that as a handle 38 is pulled out, its hook 36 moves forward against portion 46 causing shaft 44 to be oscillated forwardly on its ends which are journaled in panels 10 and 12. As an ejector 32 is pulled out the bottom package in its compartment falls down on to delivery platform 30 and on the return stroke is pushed by the ejector through opening 28 from which it falls into the delivery chute and is delivered to the customer. The operating power for shaft 44 is thus supplied by the customer.

The right hand end of shaft 44 extends through panel 10 and has a segmental casting 48 secured thereto. Casting 48 has ratchet teeth 50 that cooperate with pawl 52 on panel 10. Pawl 52 is tensioned by spring 54. The function of the ratchet and pawl mechanism 50 and 52 is to require the operator to pull out an operating handle 38 to its fullest extent to operate the ejector 32 and to complete the vending operation.

A crank arm 56 having a roller cam 58 forms an integral part of casting 48, and as main operating shaft 44 is oscillated forwardly and rearwardly, crank arm 56 and roller cam 58 will move upwardly and downwardly. This vertical movement of crank arm 56 provides the operating movement for the coin controlled mechanism described hereinafter.

A coiled spring 60 (Figs. 1 and 2) is fixedly mounted at its top end to a pin 62 on the side of casing 10 and at its bottom end to a pin 64 mounted on the forward end of crank arm 56. The function of coiled spring 60 is to restore the main operating shaft 44 to its starting position on its return stroke.

Extending between side panels 10 and 12 is a four-sided shaft 66 which is rotatably mounted in front and slightly above all ejectors 32. Shaft 66 carries removable tabs 68 which extend downwardly into the cut-away portion 40 of certain of the rods 34 associated with certain selected columns reserved for merchandise of the same price as explained hereinafter. A plate 70 is fixedly mounted on shaft 66 at its right hand end, and as each operating handle 38 having a tab 40 is pulled out, the vertical surface 42 of the rod engages a tab 68, thereby causing shaft 66 to rotate and tilting plate 70 upwardly for a purpose to be hereinafter described.

*Coin controlled mechanism*

The coin controlled mechanism is a unitary unit mounted on a removable panel 100. Panel 100 is mounted on the right hand panel 10 of the machine by means of screws 82 and 86.

It will be understood that there is mounted at the top of panel 100 a suitable coin detector or slug rejector for detecting and rejecting spurious coins. As this is a standard assembly and forms no part of the present invention, it is not illustrated and need not be described in detail. Suffice it to say that coins placed in a suitable coin slot at the top of the machine, enter the coin detector assembly and, if rejected, fall into a channeled member 76 on panel 100. Channel member 76 is a coin return chute which delivers the rejected coins into a vertical return chute which leads through an aperture 78 (Fig. 1) in side panel 10 into the common delivery chute of the machine. The coins which are found acceptable pass out of the assembly and fall by gravity into their appropriate coin chutes. Quarter coin chute 102 is mounted on the rear side of panel 100 (Fig. 3), and a casting 103 mounted on the front side of the same panel forms nickel and dime chutes 104 and 106 respectively. Casting 103 is omitted in Fig. 1 for the purpose of simplifying identification of other elements of the machine.

Figure 13:
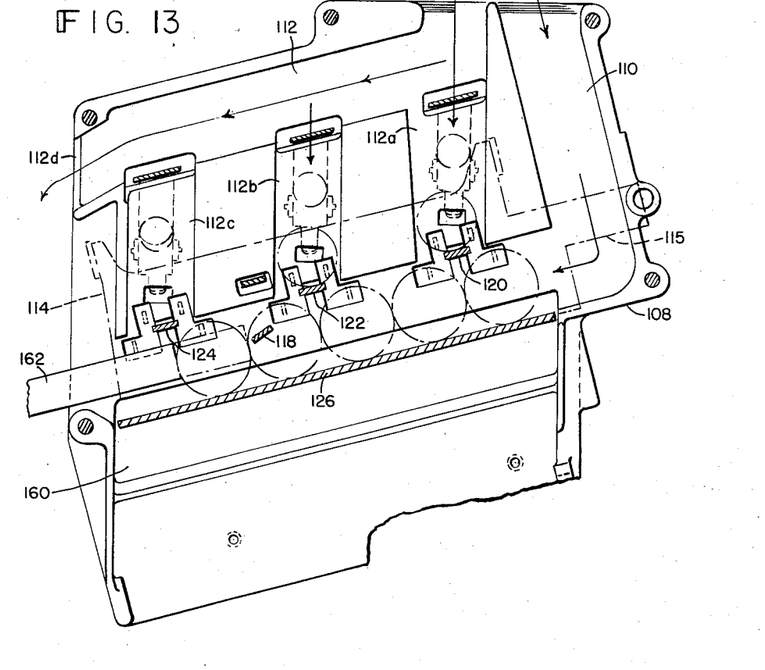
Fig. 13 is a view taken along line 13—13 of Fig. 7, showing the inner side of the coin casting plate.
Figure 14:
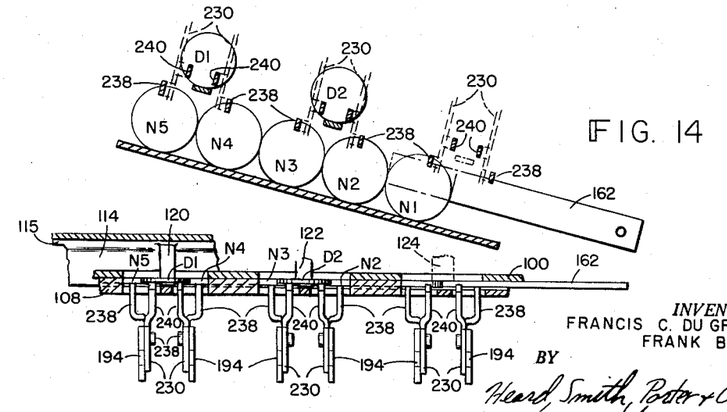
Fig. 14 is a schematic view based on Figs. 6 and 13 of the coin fingers and locking levers in working relationship.

Mounted on the front side of panel 100 is a coin casting 108 (Figs. 1, 3, 6, 7, 11 and 13). As seen in Fig. 13, the rear side of casting 108, i. e. the side which faces panel 100, has a plurality of depressions which are identified as nickel channel 110, a main dime channel 112, and branch dime channels 112a, 112b, and 112c. Coins drop into channels 110 and 112 from chutes 104 and 106 respectively. Main dime channel 112 terminates in a return opening 112d. Also mounted on the rear side of panel 100 is a pivoted coin platform 114 having an arm 115 extending toward the front edge of panel 100. Plate 114 is mounted in pivots 116 and comprises a quarter support finger 118, three dime support fingers 120, 122 and 124, and a nickel platform 126, all of which extend inwardly. A spring 128 urges plate 114 inwardly.

Quarter support finger 118 extends into quarter coin chute 102 through a suitable aperture so that a quarter dropping down the chute comes to rest on and is supported by it. A quarter by-pass element 130 is pivotally secured to the exterior of quarter chute 102 and comprises inwardly extending top and bottom flanges 132 and 134 respectively which extend through suitable apertures in the chute. A counterweight 136 on by-pass element 130 normally tilts it so as to maintain lower flange 134 within and upper flange 132 out of chute 102. Lower flange 134 is inclined downwardly so that when a quarter falling in chute 102 strikes it, element 130 will be pivoted so as to cause its upper flange 132 to enter chute 102. The quarter is then supported on support finger 118 and so long as it is thus supported, will keep upper flange 132 in chute 102 to block the passage of any additional quarters and by-pass them to quarter by-pass return chute 138 which connects with a vertical main return chute 74. At its bottom end main return chute 74 is connected to curved chute 142 described hereinafter. As stated hereinabove, vertical chute 74 also receives rejected coins or slugs directed to it via channel 76 from the coin detection and rejection mechanism (also not shown).

Similarly, controlled bypass elements 144, 146 and 148 are mounted directly on panel 100 and their upper and lower flanges extend through suitable apertures into dime branch channels 112a, b and c. Dime support fingers, 120, 122 and 124 also extend into the dime branch channels through suitable apertures in panel 100. Since the machine is set to operate upon insertion of 25¢ the third dime bypass elements 148 is permanently immobilized by means of leaf spring 150 secured to panel 100. As a result branch dime channel 112c is permanently blocked and any excess dimes over two will automatically be bypassed to coin return chute 74 which communicates with dime return opening 112d in casting 108.

Figure 3:
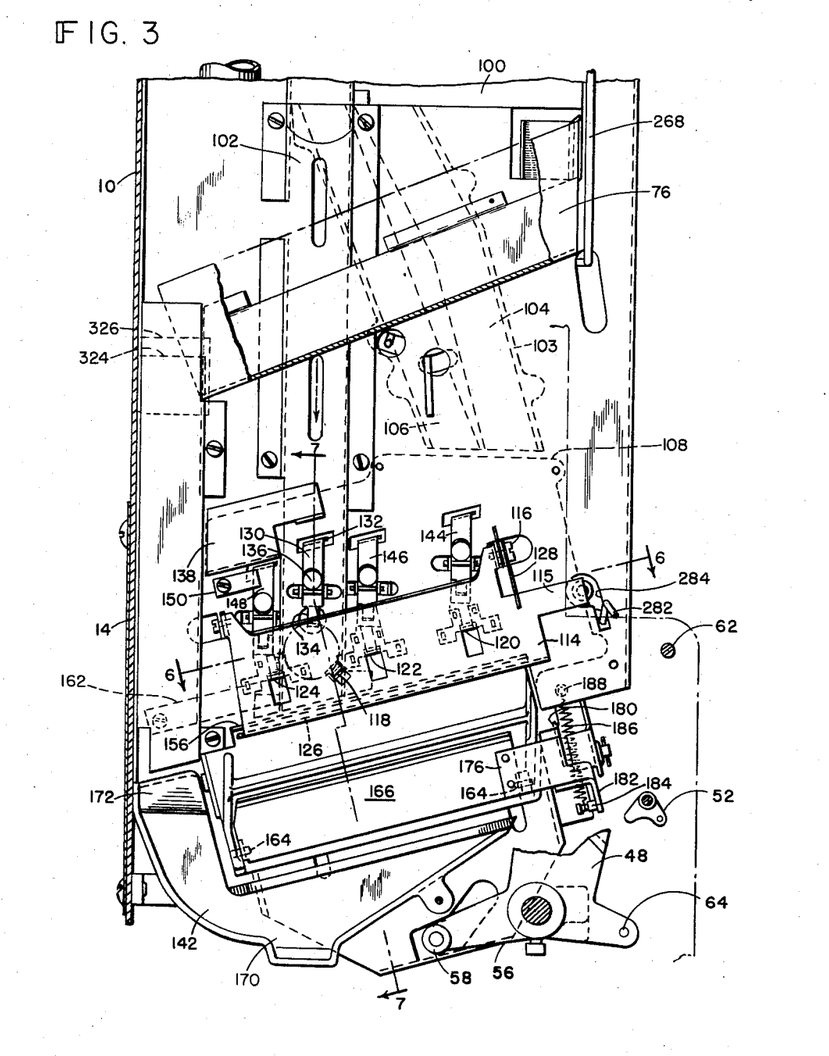
Fig. 3 is a side elevation of the coin control mechanism and the panel on which the mechanism is mounted as seen from the position indicated by lines 3—3 of Fig. 2.
Figure 7:
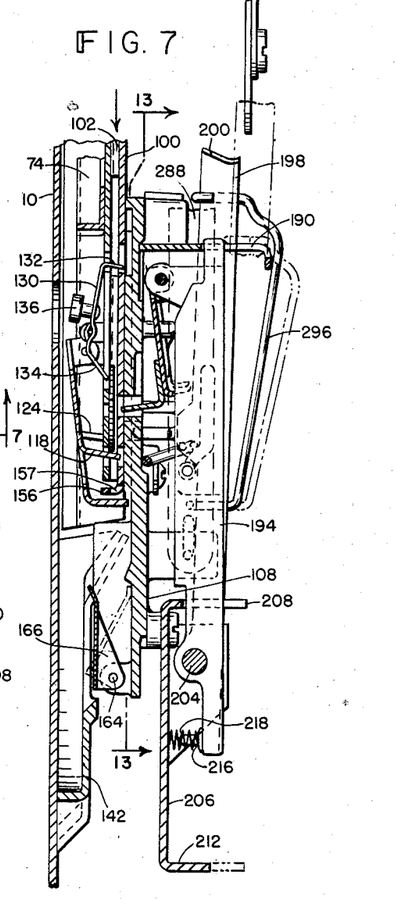
Fig. 7 is a vertical section taken along line 7—7 of Fig. 6.

As seen in Figs. 3 and 7, the bottom edge of panel 100 has a flange 156 under which nickel platform 126 of coin platform plate 114 extends into engagement with the bottom recessed portion 160 of coin casting 108. The nickels in channel 110 then pass on to and are supported by nickel platform 126. The length of platform 126 is made sufficiently great to accommodate six nickels. However, since the machine in this case is set to vend articles upon insertion of 25¢, a narrow bar 162 is mounted on panel 10 and extends into the nickel channel a distance sufficient to restrict the number of nickels that can fit on platform 126 to five.

In order to permit the quarter resting on quarter support finger 118 to pass out of chute 102 when the finger is withdrawn therefrom, a slot 157 is provided in flange 156, chute 102 terminating just above the flange. Pivotally secured at 164 to the lands on either side of the recessed portion 160 of casting 108 is a coin return gate 166 which serves to direct coins dropped from the coin channels either into the coin box of the machine or to the curved coin return chute 142 positioned on panel 10 of the machine.

Chute 142 slopes downwardly to a guide portion 170 that directs coins through opening 78 in panel 10 to the main delivery chute of the machine. Chute 142 at its rearward side has a section 172 that is inclined outwardly of panel 10 so as to provide a large entrance for coins dropping out of main coin return chute 74.

Coin return gate 166 carries a laterally extending bracket 176 having an arm 180 (to be actuated by the coin return mechanism hereinafter described) and an arm 182 carrying a pin 184. A coil spring 186 connected at one end to a pin 188 on panel 100 and at its other end to pin 184 holds gate 166 in either of its two positions.

From the foregoing it is clear that when coin platform plate 114 is tilted outwardly at the bottom on its pivots 116, quarter support finger 118, dime support fingers 120, 122, and 124, and nickel platform 126 are drawn away from panel 100 and the coins supported thereby then drop out of the coin channels and are directed either to the coin box (not shown) or to the coin return chute 142, depending upon the position of coin return gate 166.

The mechanism for tilting coin platform plate 114 and coin return gate 166, to be described hereinafter, is mounted on the outer side of removable panel 100.

Mounted on the outer side of coin casting 108 is a locking bracket or plate 190 which extends outwardly therefrom and inclines downwardly from front to rear parallel to nickel platform 126.

Figure 1:
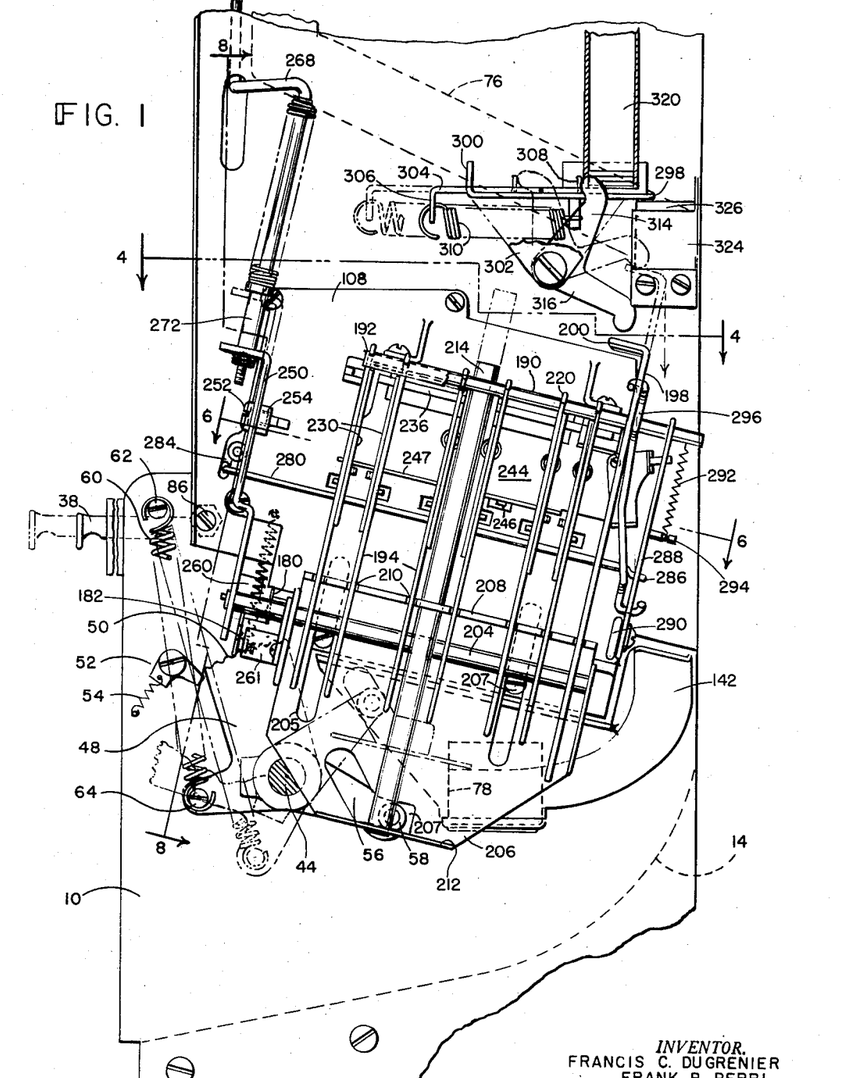
Fig. 1 is a view in elevation of a substantial portion of the right hand side of the machine.
Figure 2:
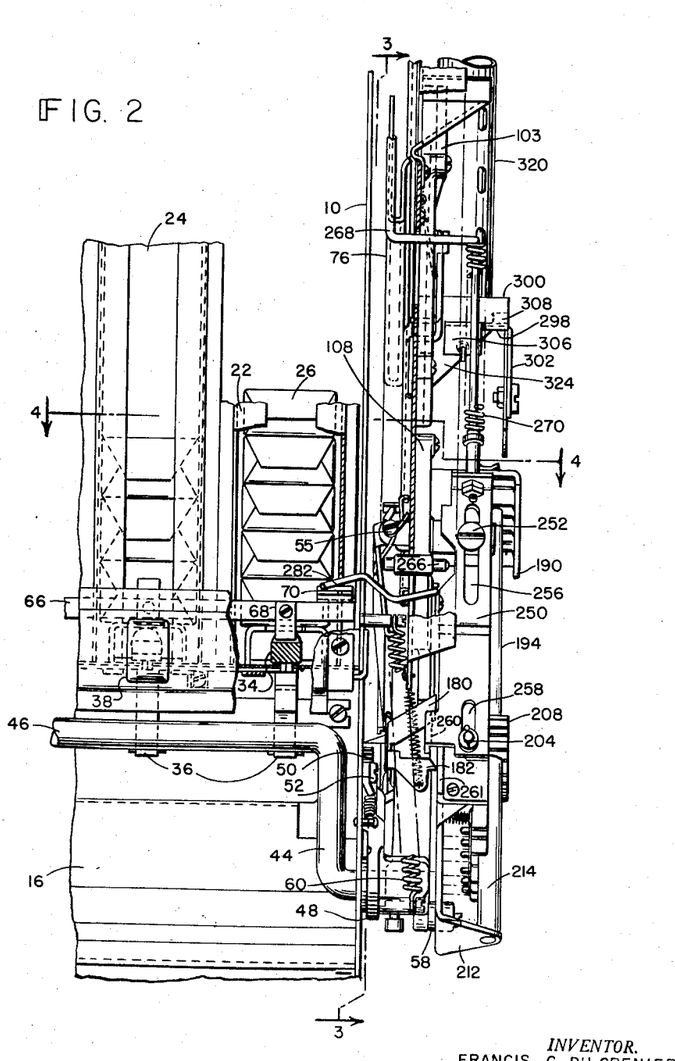
Fig. 2 is a fragmentary front view in elevation of the right hand portion of the machine.

Bracket 190 has six slots 192 to receive the upper ends of six movable locking bars 194, one for each of six nickels for which the machine may be set for operation, and a seventh slot for receiving an operating lever 198 for the single coin change maker to be hereinafter described (see Fig. 1).

Locking bars 194 are mounted for pivotal movement on a bar 204 carried by a carriage plate 206. Carriage plate 206 has slots 205 which cooperate with screws 207 to hold the carriage plate in vertical sliding engagement with casting 108. Carriage plate 106 has an outwardly extending flange 208 at its top having slots 210 through which locking bars 194 extend. At its bottom, plate 206 has a second flange 212 which supports a rod 214 that is mounted in an opening in flange 208 and is slidably extended through locking bracket 190. As seen in Figs. 7, 9, 10 and 11, each locking bar 194 has an inwardly extending arm 216 that is embraced by a compression spring 218 that pushes out from plate 206 and urges the top end of the levers inwardly of removable panel 100. At its upper end each locking lever has a finger 220, and at the base of each finger a right angle locking surface 222 which normally is blocked by locking plate 190 at the rear of each slot 192.

Below locking surface 222 is a sloping cam surface 224 which cams the locking bar outwardly to permit upward movement of the entire movable mechanism which includes carriage plate 206 and the elements carried thereby. Pivotally connected to each locking lever 194 by means of a shoulder rivet 228 is a feeler lever 230 provided with a slot 232 having a lower sloping surface 232a. Each lever 230 has an arm 234 provided with an aperture whereby the lever is mounted on a pivot bar 236. Each lever 230 also has an inwardly extending nickel feeling finger 238 and a dime feeling finger 240 (see Fig. 9), which extend through suitable apertures in coin casting 108 into the coin channel areas occupied by nickels and dimes supported in position on nickel platform 126 and dime support fingers 120, 122, and 124. When coins are in position on their supporting platform or support fingers, they act as stops against nickel and dime fingers 238 and 240, holding the lower ends of feeler levers 230 spaced outwardly from coin casting 108. Thus as carriage plate 206 carrying lock levers 194 is caused to move upwardly, the sloping portion of slot 232 cams rivet 228 and locking lever 194 away from casting 108 to prevent locking surface 222 from engaging locking plate 190. Cam surface 224 of each lever then engages the rear edge of slot 192 and thereby cams its lever outwardly to permit it to move upwardly through slots 192 to complete the vending operation. Unless the proper coins are inserted to act as stops for fingers 238 and 240, the locking levers will be unable to slide around the locking plate 190.

To achieve the same result when a quarter coin is inserted, a quarter feeler plate 244 pivotally mounted at its top to pivot bar 236 and carrying at its bottom edge a quarter feeler finger 246 which extends through a suitable aperture in coin casting 108 to abut against a coin in the quarter channel supported on quarter support finger 118.

A spring (not shown) spaces feeler plate 244 at its lower edge from coin casting 108. In addition quarter feeler plate 244 has a flange 247 on its lower edge. When the vending machine is operated with a quarter, the quarter drops into position on quarter support finger 218 and, in this position, serves as a stop for quarter feeler finger 246, thereby maintaining quarter feeler plate 244 in spaced relation with casting 108 at its bottom end so that flange 247 engages and pushes the locking levers 194 outwardly to permit them to slide through slots 192 to complete the vending operation. In the absence of a quarter, the quarter feeler plate is incapable of pushing levers 194 outwardly.

In this set up for 25¢ operation, the sixth locking lever (counting from left to right in Fig. 1) is permanently immobilized by a price change plate 162 which occupies the position in the coin channel which would normally be filled by the sixth nickel and thus maintain the sixth locking lever out of engagement with locking plate 190 at the rear edge of the slot 192.

Of course, the upward movement of carriage plate 206 and locking levers 194 is effected by the main operating shaft 44 operating through crank arm 56 and roller cam 58. Roller cam 58 extends into a slot 207 in carriage plate 206. As an operating handle 38 is pulled out and then pushed in again to complete the vending operation, shaft 44 is oscillated forwardly and rearwardly, thereby causing crank arm 56 to rotate. Roller cam 58 forces carriage plate 206 to move up and down to permit completion of the vending operation. The freeing of locking levers 194 permits main operating shaft 44 to complete its forward oscillating stroke to operate an ejector 32 and thus eject the lowermost package in a column of cigarette packages.

Figure 8:
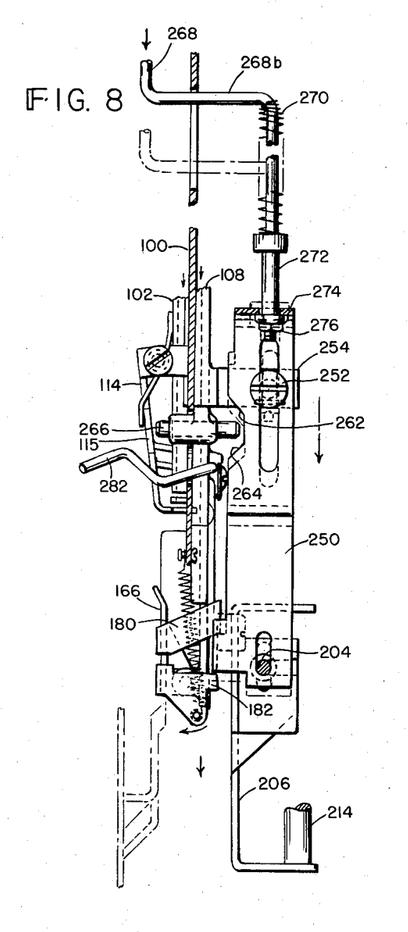
Fig. 8 is a partial vertical section taken along line 8—8 of Fig. 1, showing manual operation of the coin return and gate tilting mechanism.
Figure 9:
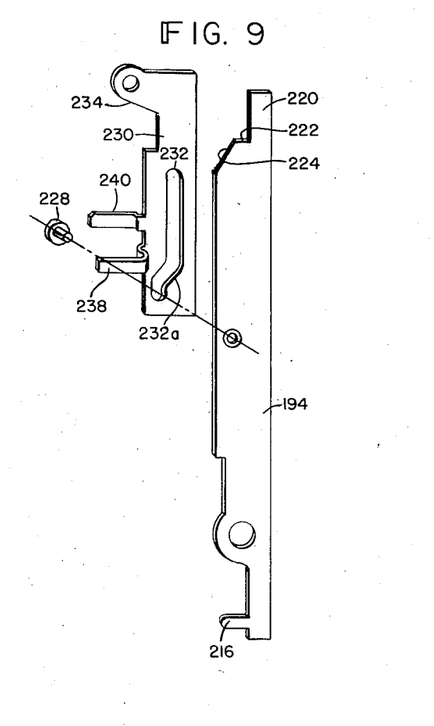
Fig. 9 is an exploded view of the locking lever assembly.
Figure 10:
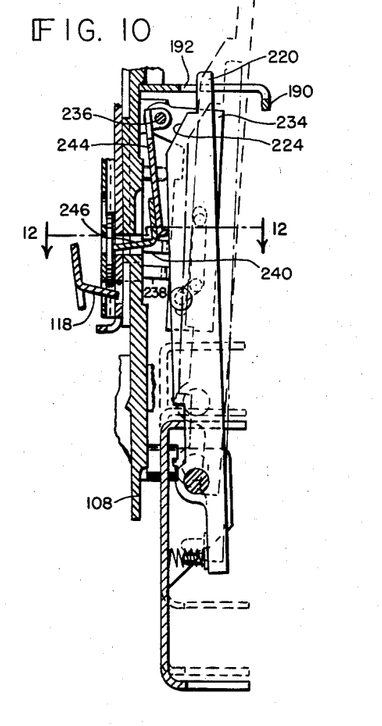
Fig. 10 is a partial vertical section similar to Fig. 7 showing operation of the locking levers on a quarter.
Figure 11:
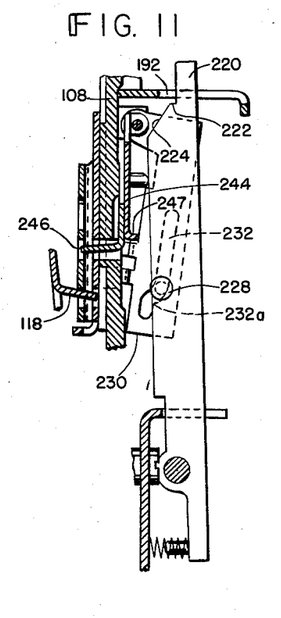
Fig. 11 is a vertical section similar to Fig. 10, showing locking of the levers in the absence of a coin.
Figure 12:
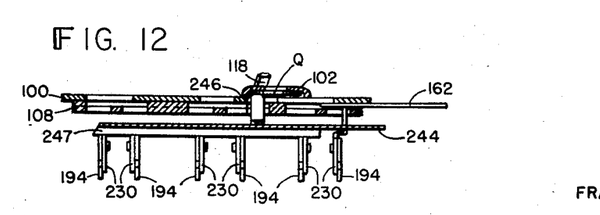
Fig. 12 is a horizontal section taken on line 12—12 of Fig. 10, showing disposition of certain other parts of the coin control mechanism.

Tilting of coin platform plate 114 to dislodge the coins supported by it is associated with a coin return mechanism. Briefly, this mechanism comprises a platform operating bar 250 mounted for vertical reciprocal movement by a shoulder screw 252 mounted on a bracket 254 and passing through a slot 256 adjacent its upper end. The lower end of bar 250 has a slot 258 in which the end of pivot bar 204 is slidable to provide a lost motion of bar 204 until locking levers 194 strike locking plate 190. Thereafter when levers 194 pass around the rear edge of slots 192 during a vending operation, bar 250 is moved upward by pivot bar 204, bar 250 sliding on a shoulder screw 252. The lower end of bar 250 also carries an arm 260 which, upon downward movement of bar 250, actuates operating arm 182 to tilt the coin return gate 166 clockwise from the position illustrated in Fig. 8 so as to direct all coins to coin return chute 142. An arm 261 carried by carrying plate 206 is positioned to engage operating arm 180 upon upward movement of the carriage plate during a vending operation to rotate coin return gate 166 to the position shown in Fig. 8 so that all coins in the machine will drop vertically into a coin box (not shown) instead of into return chute 142.

The upper portion of bar 250 has sloping cam surfaces 262 and 264 (Fig. 8) which are above and below a pin 266 which is movably mounted in coin casting 108 and extends through the casting and panel 100 directly behind arm 115 of coin platform 114. Pin 266 is spring loaded to oppose being urged in the direction of arm 115 of coin platform plate 114. When bar 250 is moved upwardly, pin 266 is pushed in by cam surface 264 and when bar 250 moves down, the pin is pushed in by cam surface 262. When the pin is pushed in the coin platform is tilted to dislodge any coins supported therein. Downward movement of bar 250 is effected by a coin return lever (not shown) which operates through a wire rod 268.

Rod 268 carries a coil spring 270 buttressed at its top end against the horizontal portion 268b of rod 268 and at its lower end pressed against collared sleeve 272 which is slidably mounted on rod 268. The lower end of sleeve 272 is slidably positioned in an aperture in flange 274 of operating bar 250 and is pressed against nuts 276 threaded on the lower end of rod 268. As carriage plate 206 is moved upward, bar 250 slides on sleeve 272 until flange 274 engages the collar on the sleeve. Thereafter spring 270 is compressed by flange 274. The energy thereby stored in the spring assists carriage plate 206 to return to its original position on completion of the vending operation.

On actuation of the coin return lever (not shown) downward movement of rod 268 and operating bar 250 causes arm 260 to engage and push arm 182 downward, thus tilting coin return gate 166 to an inclined position relative to panel 10 to direct coins to the coin return chute. Spring 186 holds the gate in this position. However, when carriage plate 206 is again caused to move upwardly during the next vending operation, arm 261 on carriage plate 206 will engage and push up on arm 180 on coin return gate 166, causing the latter to pivot to the vertical position shown in Fig. 8 to direct coins to the cash box of the machine instead of to the coin return chute. Spring 186 thus holds gate 166 in this vertical position until the coin return lever (not shown) is again operated by the customer.

First coin changemaker

Mounted on panel 100 is a single coin changemaker which includes a rod 280 (Fig. 1) pivotally mounted on the outside of coin casting plate 108 in a plane parallel to pivot bar 204 at right angles to locking levers 194. Rod 280 has a crank 282 at its forward end (Figs. 2, 3, and 6) which extends through a slot 284 in removable panel 100 in position to be engaged and lifted by plate 70 on shaft 66 when a tab 68 is engaged by an operating handle 38. At its opposite end rod 280 has a second crank 286 which is rotatably mounted in a lever 288 which is slidably mounted for vertical reciprocal movement parallel to locking levers 194 on a bracket 290 on coin casting plate 108. The upper end of lever 288 extends through a slot in bracket 190. A coil spring 292 attached at one end to bracket 190 and at its opposite end to a pin 294 holds lever 288 in its upward position. A wire rod 296 is rotatably secured at one end in an opening in lever 288.

As seen in Fig. 7, wire rod 296 is bent to extend over the edge of bracket 190 and its upper end is bent around a changemaker operating lever 198 having a flange 200 which is carried by carriage plate 206. When rod 280 is rotated by plate 70, lever 288 is moved downward by crank 286 against spring 292, pulling wire rod 296 with it. As illustrated in Fig. 7, when rod 296 is pulled down, the bent portion of rod 296 is cammed outward by the edge of bracket 190, thereby causing lever 198 to pivot on bar 204. The upper end of lever 198 moves away from panel 100 so that flange 200 is in position to actuate the changemaker assembly mounted on panel 100 above bracket 190.

The changemaker assembly comprises a bracket 298 mounted on panel 100 having an upstanding flange 300 and a depending flange 302. A slide 304 is positioned on the upper horizontal portion of bracket 298 and extends through a slot in upstanding flange 300. Slide 304 has a depending flange 306 at its forward end, and an arm having an upstanding flange 308 extending outwardly from panel 100. A tension spring 310 is secured at one end to depending flange 306 and at its other end to a downwardly extending pin mounted on the underside of bracket 298. A bell crank lever comprising arms 314 and 316 is pivotally mounted on depending flange 302. Upper arm 314 extends through a slot in the horizontal portion of bracket 298 and engages upstanding flange 308 of slide 304. Lower arm 316 extends downwardly in position to be engaged by flange 200 of operating lever 198 when the latter is pivoted away from panel 100 by operation of wire rod 296 and carried upward by carriage plate 206.

Secured to panel 100 on the upper side of bracket 298 is a tube 320 for carrying a stack of coins, in this case, pennies. The bottom end of tube 320 is spaced from the floor of bracket 298 a distance sufficient to accommodate slide 304 which is of a thickness substantially corresponding to the thickness of one penny. In its normal position the rear end of slide 304 is between tube 320 and the floor of bracket 298. However, when bell crank arm 316 is engaged by lever 198, the slide is pushed forward out from beneath tube 320 and a coin drops onto bracket 298. When lever 198 is returned to its normal position, slide 304 is pulled by spring 310 back to its original position. On the return stroke of slide 304 induced by spring 310, the penny resting on bracket 298 is ejected rearwardly into coin return chute 324 positioned on panel 100. The coins are directed by chute 324 through an opening 326 in panel 100 to vertical coin return chute 74.

Except for the means by which operating lever 198 is pivoted away from panel 100 so as to engage the bell crank of the changemaker when carriage plate 206 moves lever 198 upwardly, the details of the foregoing assembly and the elements for operating it are the same as in our copending application Serial No. 243,234 filed August 23, 1951. It is to be understood, of course, that more than one coin tube 320 may be associated with bracket 298 and that the stroke of slide 304 can be modified to provide ejection of coins from each of several coin tubes.

Second coin changemaker

Figure 4:
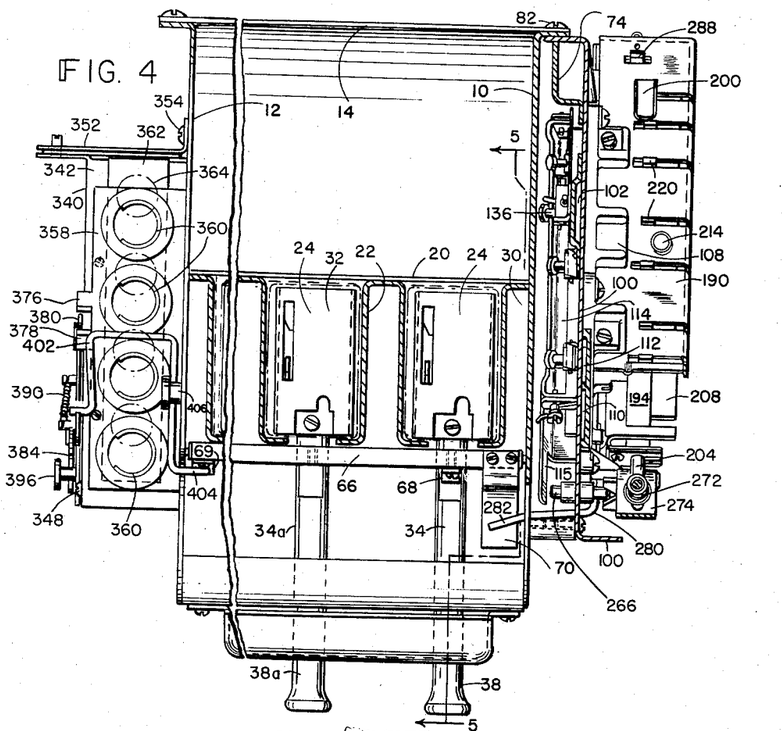
Fig. 4 is a fragmentary plan view in section taken along line 4—4 of Fig. 2, but including both the right and left hand sides of the machine.
Figure 5:
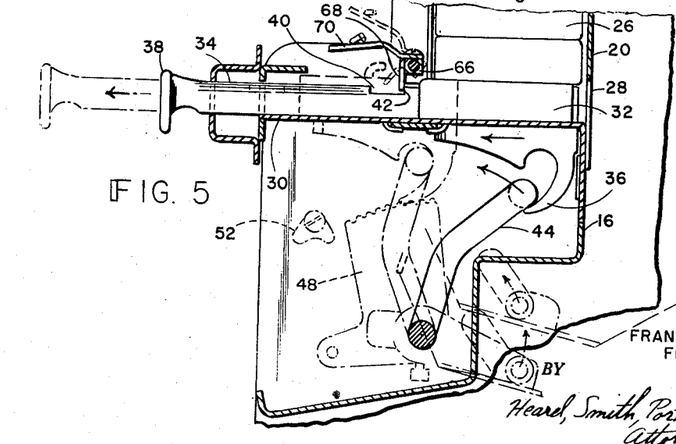
Fig. 5 is a vertical section taken along line 5—5 of Fig. 4.
Figure 6:
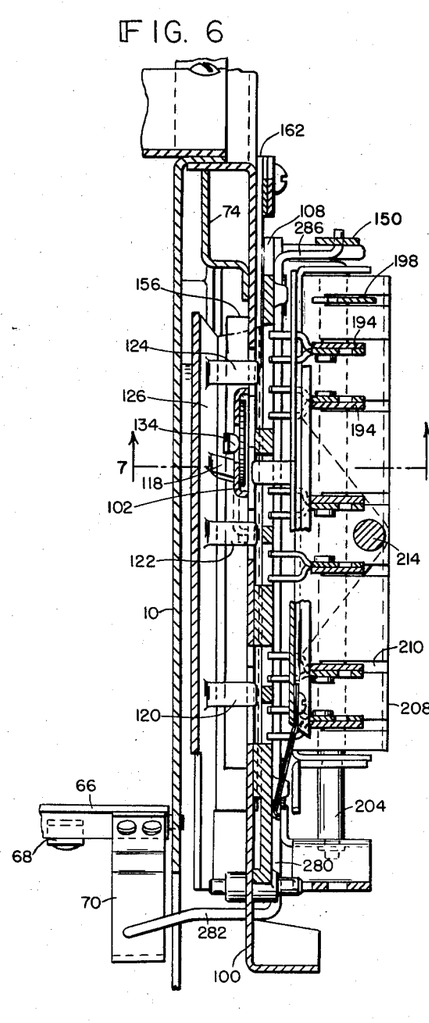
Fig. 6 is a horizontal section taken along line 6—6 of Fig. 3.
Figure 15:
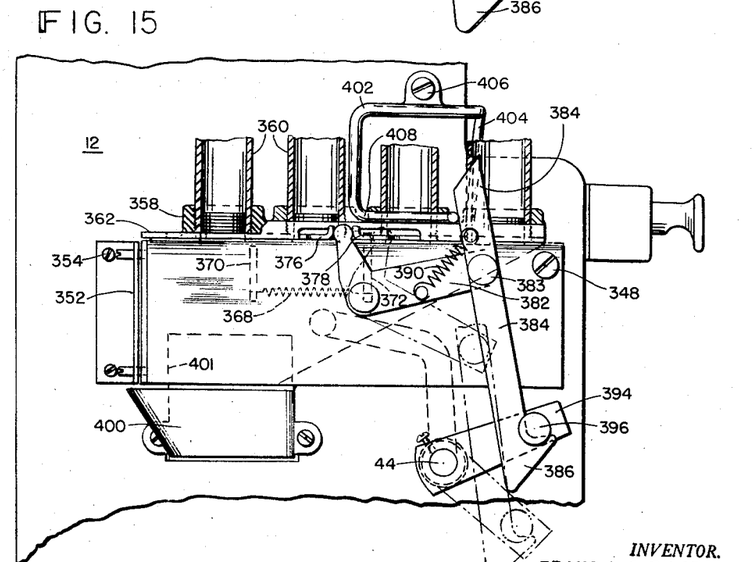
Fig. 15 is a fragmentary view in elevation of the left hand side of the machine showing the novel multi coin change maker mechanism of this invention; and, Fig. 16 is a perspective view of certain elements of the multi coin change maker mechanism.
Figure 16:
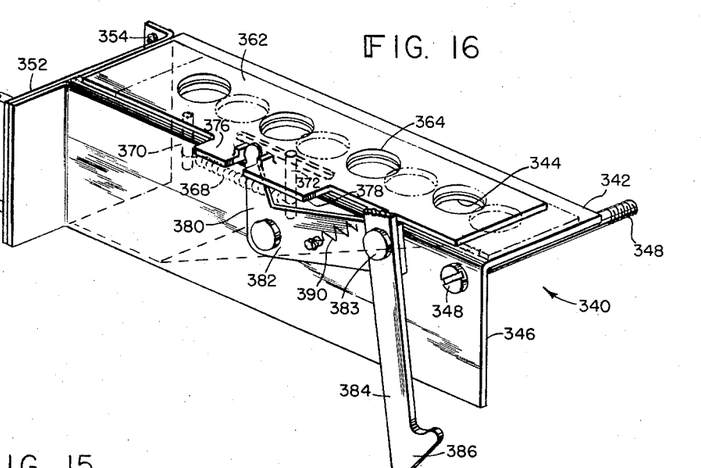

To the foregoing machine we have added a second changemaker assembly which greatly amplifies its advantages and adaptability. This second changemaker assembly is mounted on panel 12 of the machine, and as seen in Figs. 4, 15, and 16, it comprises a bracket 340 having a top horizontal floor 342 provided with a plurality of openings 344 and a vertical side wall 346. Bracket 340 is secured to wall panel 12 by means of a bolt 348 extending through an opening in side wall 346 and an angle iron plate 352 secured by screws 354. Secured to the upper side of floor 342 is a base 358 for supporting four penny coin tubes 360. It is to be understood that the number of tubes is not fixed and that four are illustrated merely to better indicate how a changemaker may comprise more than one coin tube. Positioned between base 358 and floor 342 is a slide 362 having a plurality of coin holes 364 corresponding in number to openings 344. A spring 368 is connected between a pin 370 depending from floor 342 and a pin 372 depending from slide 362 and extending through an elongated slot in floor 342. Spring 368 holds slide 362 in position so that its holes 364 are in registration with openings 344.

Slide 362 has two arms 376 and 378 that extend outwardly from bracket 340 through an elongated slot in base 358. Pivotally mounted on side wall 346 is a bell crank lever comprising arms 380 and 382. Arm 380 extends between slide arms 376 and 378 and operates thereon to move slide 362 forwardly and rearwardly. Bell crank arm 382 has a lever 384 pivoted at 383 at one end. Lever 384 has a hook portion 386 at its extremity. A spring 390 urges lever 384 counter-clockwise as viewed in Fig. 15.

Main operating shaft 44 is journaled in and extends through machine side panel 12 and has affixed to its end an arm 394 provided with a shoulder rivet 396. When the machine is at rest, rivet 396 is in engagement with hook portion 386 of lever 384. When shaft 44 is actuated without disengaging lever 384 from rivet 396, arm 384 is pulled down, causing the bell crank lever to rotate clockwise as seen in Fig. 15. As a result slide 362 is moved forward to place its coin holes 364 in registration with coin tubes 360 so that the bottommost coin in each tube will fall into a coin hole 364. When shaft 44 returns to its original position, slide 362 is also returned by bell crank arm 380 to its original position. As soon as holes 364 are again in registration with openings 344, the coins fall through the latter opening into a coin return chute 400 on panel 12. The coins pass from chute 400 into the main delivery chute of the machine through an opening 401 in side panel 12.

However, in order that the changemaker assembly on panel 12 will operate only when the other changemaker on panel 100 is not operating, and vice versa, means are provided to effect selective operation of the changemakers. Part of these means have been already described and comprise shaft 66, tabs 68, plate 70, and rod 280. Each time a tab 68 is engaged by a rod 34 of an operating handle 38, plate 70 is tilted and thereby engages crank 282 to actuate the changemaker assembly on panel 100. At the same time a depending tab 69 mounted on shaft 66 adjacent panel 12 is caused to engage one end 404 of a wire rod 402 pivotally mounted at 406 on the outside of panel 12. The other end 408 extends near the upper end of hook lever 384. Each time that wire rod 402 is caused to pivot at 406, it pivots lever 384 on bell crank arm 382 so that its hook portion 386 is disengaged from shoulder rivet 396. When this is done the multi-tube changemaker is rendered inoperative and only the changemaker on panel 100 is actuated. However, if the operator pulls operating handle 38a which has no tab 68 extending down over the rod 34a associated with the selected handle 38a, shaft 66 is not rotated and wire rod 402 is not caused to disengage hook lever 384 from rivet 396. As a result the multi-tube changemaker is operated as described hereinabove and the changemaker on panel 100 remains inoperative. Of course, this latter operation occurs only when a handle 38a associated with a low price column is operated.

While the changemakers as illustrated are designed to dispense pennies, it is believed apparent that they may be replaced by changemakers adapted to hold and dispense coins of larger denominations, e. g. nickels or dimes, if desired. Similarly, the changemakers may be modified to the extent that their coin slides are thicker so as to accommodate two coins in each slide opening instead of one, as illustrated. It is also to be understood that both changemakers may be rendered inoperative by (a) not placing coins in the tubes, or (b) by removing plate 70 and providing a tab 68 for each rod 34. If it is desired that only the single changemaker be rendered inoperative, it is necessary only to remove or reverse the position of all tabs 68 and to remove plate 70. The multi-changemaker can be rendered permanently inoperative by providing tabs 68 for all of ejector rods 34.

As a consequence of having two changemakers, the machine is adapted to accommodate and vend articles of many different prices with little or no mechanical adjustments required to convert from one selling price to another.

Obviously many modifications and variations of the present invention are possible in the light of the above teachings. Therefore, it is to be understood that the invention is not limited in its application to the details of construction and arrangement of parts specifically described or illustrated, and that within the scope of the appended claims it may be practiced otherwise than as specifically described or illustrated.

We claim:
1. In a vending machine comprising a main operating shaft, a plurality of selector elements, a plurality of compartments adapted to receive articles to be vended by the machine, means associated with each of said selector elements for ejecting articles from said compartments upon operation of said selector elements, means associated with each selector element for operating said shaft and a coin actuated mechanism for controlling operation of said shaft by said selector elements, the improvement comprising first and second change makers, means normally connecting said operating shaft and said second change maker whereby said second change maker will be operated upon operation of said shaft, means controlled by only certain of said selector elements for operating said first change maker, and means controlled by the said certain selector elements for breaking the connection between said operating shaft and said second change maker to render said second change maker inoperative.

2. In a vending machine comprising a plurality of selector elements, a plurality of compartments adapted to receive articles to be vended by the machine, means associated with each of said selector elements for ejecting articles from said compartments upon operation of said selector elements, a main operating shaft, means carried by each of said selector elements for operating said shaft, and a coin controlled mechanism for controlling operation of said shaft by said selector elements, the improvement comprising first and second change maker assemblies, means normally connecting said shaft and said second change maker whereby said second change maker is actuated by operation of said shaft, a bar extending transversely of said selector elements and mounted for rotation about its longitudinal axis, means carried by said bar extending in the path of certain of said selector elements, means associated with said certain selector elements for engaging said means carried by said bar whereby to pivot said bar about its longitudinal axis, means controlled by said bar for actuating said first change maker when said certain selector elements are operated, and means carried by said bar for breaking the connection between said shaft and said second change maker whereby to render said second change maker inoperative when said certain selector elements are operated.

3. A vending machine comprising first and second vertically extending side panels, means defining a plurality of compartments between said side panels for containing articles to be vended, a plurality of selector elements associated with said compartments, ejector means carried by each of said selector elements for removing articles from said compartments, a chute positioned to receive articles ejected from said compartments for delivery to the operator of the machine, an operating shaft extending transversely of said side panels, means mounting said operating shaft for oscillating movement, means associated with each of said selector elements for engaging said operating shaft and causing said operating shaft to be oscillated, coin controlled mechanism connected to and operated by said shaft, said coin controlled mechanism including means acting to prevent oscillation of said shaft until a predetermined number of coins has been deposited in the machine, first and second change maker assemblies mounted on said first and second side panels respectively, means carried by said operating shaft normally operated to actuate said second change maker upon oscillation of said shaft, means associated with said coin controlled mechanism for actuating said first change maker, said means for actuating said first change maker normally being inoperative relative to said first change maker, and means operated by certain ones of said selector elements for rendering operative said actuating means for the first change maker and simultaneously rendering inoperative said actuating means for the second change maker.

4. In a vending machine having a plurality of magazines for containing articles to be vended, an ejector for each of said magazines, and an operating handle associated with each ejector, the combination comprising, container means for storing a plurality of coins, means for dispensing a predetermined number of coins from said container means, lever means for operating said dispenser means, an operating shaft, a crank arm carried by said shaft, means normally holding said lever means in operating engagement with said crank arm, whereby to cause operation of said dispenser means when said operating shaft is turned, and means controlled by said operating handles for selectively moving said lever means out of operating engagement with said crank arm, whereby to render said dispenser means inoperative.

5. A vending machine comprising first and second vertically extending side panels, means defining a plurality of compartments between said side panels for containing articles to be vended, a plurality of selector elements associated with said compartments, ejector means carried by each of said selector elements for removing articles from said compartments, a chute positioned to receive articles ejected from said compartments for delivery to the operator of the machine, a bar extending transversely of said side panels, means mounting said bar for rotation about its longitudinal axis, means carried by said bar adapted to be actuated by certain of said selector elements whereby to cause rotation of said bar, an operating shaft extending transversely of said side panels, means mounting said operating shaft for oscillating movement, means associated with each of said selector elements for engaging said operating shaft and causing said operating shaft to be oscillated, coin controlled mechanism connected to and operated by said shaft, said coin controlled mechanism including means acting to prevent oscillation of said shaft until a predetermined number of coins has been deposited in the machine, first and second change maker assemblies mounted on said first and second side panels respectively, means carried by said operating shaft normally operative to actuate said second change maker upon oscillation of said shaft, means associated with said coin controlled mechanism for actuating said first change maker, said means for actuating said first change maker normally being inoperative relative to said first change maker, means actuated by rotation of said bar for rendering operative the actuating means for said first change maker, and means actuated by rotation of said bar for rendering inoperative the actuating means for said second change maker.

6. In a vending machine comprising a plurality of compartments, adapted to receive articles to be vended by the machine, a plurality of movable selector elements, means associated with each selector element for ejecting articles from said compartments upon operation of said selector elements, an operating shaft journaled at its ends for rotation on its own axis, means associated with each selector element for causing said shaft to rotate when said selector elements are operated, coin acutated mechanism linked to said operating shaft, said coin actuated mechanism normally preventing said operating shaft from rotating whereby to restrict movement of said selector elements and prevent operation of said ejector means, said coin actuated mechanism being incapable of preventing movement of said shaft and operation of said selector elements when a predetermined number of coins are deposited in the machine, the combination comprising first and second change maker assemblies mounted adjacent the opposite ends of said operating shaft, first means for actuating said first change maker assembly, said first actuating means normally being in a first inoperative position and being movable to a second operative position, means connected to said shaft for operating said first actuating means upon rotation of said shaft, second means for actuating said second change maker assembly, releasable means normally connecting said second actuating means to said operating shaft whereby said second change maker is operated by movement of said shaft, means associated with certain of said selector elements for releasing said connecting means and simultaneously moving said first actuating means to said second position whereby said first actuating means will actuate said first change maker upon operation of said shaft.

7. In a vending machine comprising a plurality of compartments adapted to receive articles to be vended by the machine, a plurality of selector elements each provided with means for ejecting articles from one of said compartments upon operation of said selector elements, an operating shaft mounted for rotation about its own axis, means carried by each of said selector elements for engaging said shaft and causing said shaft to be rotated about its axis, said shaft engaging means normally being out of engagement with said shaft, a coin actuated mechanism for controlling rotation of said shaft and preventing said selector elements from being operated to the extent necessary to eject articles from said compartments, first and second change makers mounted at opposite ends of said operating shaft, first and second actuating means for actuating said first and second change makers respectively, means releasably connecting said second actuating means to said shaft whereby said actuating means will be operated when said shaft is rotated, lever means controlled by said shaft for operating said first actuating means, said lever means normally being inoperative relative to said first actuating means, means controlled by certain of said selector elements for releasing said connecting means and simultaneously rendering said lever means operable relative to said first change maker, whereby when one of said certain selector elements is operated said first change maker will be simultaneously operated and said second change maker will remain at rest.

8. In a vending machine comprising a plurality of compartments for containing articles to be vended, a plurality of movable selector elements, means operated by said selector elements for ejecting articles from said compartments upon operation of said selector elements, an operating shaft journaled for rotation on its own axis, and means operated by each selector element for rotating said shaft when said selector elements are operated, the combination comprising a change maker, means releasably connected to said operating shaft for operating said change maker each time said shaft is rotated, and means operated by certain ones of said selector elements for disconnecting said change maker operating means from said operating shaft.

9. In a vending machine comprising a plurality of compartments for containing articles to be vended, a plurality of movable selector elements, means operated by said selector elements for ejecting articles from said compartments upon operation of said selector elements, an operating shaft journaled for rotation on its own axis, and means operated by each selector element for rotating said shaft when said selector elements are operated, the combination comprising a change maker, means for actuating said change maker, means releasably connecting said actuating means and said operating shaft for operating said actuating means each time said shaft is rotated, and means operated by certain ones of said selector elements for releasing said connecting means whereby said change maker is prevented from being operated when said shaft is rotated in response to the operation of said certain selector elements.

References Cited in the file of this patent

UNITED STATES PATENTS

| 1,815,343 | Barnes | July 21, 1931 |
| 1,938,815 | Du Grenier | Dec. 12, 1933 |
| 2,457,187 | Steiner | Dec. 28, 1948 |

FOREIGN PATENTS

| 495,352 | Belgium | Aug. 16, 1950 |